United States Patent
Ramesh et al.

(10) Patent No.: US 7,200,977 B2
(45) Date of Patent: Apr. 10, 2007

(54) HEAT-SHRINKABLE MULTILAYER PACKAGING FILM COMPRISING INNER LAYER COMPRISING A POLYESTER

(75) Inventors: Ram K. Ramesh, Cedar Rapids, IA (US); John R. Wolf, Phillipsburg, NJ (US); George D. Wofford, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 301 days.

(21) Appl. No.: 10/041,129

(22) Filed: Jul. 23, 2003

(65) Prior Publication Data
US 2004/0065052 A1   Apr. 8, 2004

Related U.S. Application Data

(62) Division of application No. 09/034,836, filed on Mar. 4, 1998, now Pat. No. 6,610,392.

(51) Int. Cl.
*B65B 31/02* (2006.01)
*B65B 7/02* (2006.01)

(52) U.S. Cl. ............................. 53/434; 53/443; 53/469; 53/477

(58) Field of Classification Search .......... 53/432–434, 53/510–512
See application file for complete search history.

(56) References Cited

U.S. PATENT DOCUMENTS

| | | |
|---|---|---|
| 4,064,296 A | 12/1977 | Bornstein et al. |
| 4,120,716 A | 10/1978 | Bonet |
| 4,188,443 A | 2/1980 | Mueller et al. |

(Continued)

FOREIGN PATENT DOCUMENTS

DE   1 636 055   2/1971

(Continued)

OTHER PUBLICATIONS

ASTM D-882, "Standard Test Methods for Tensile Properties of Thin Plastic Sheeting", pp. 194-199, Nov. 15, 1991.

(Continued)

*Primary Examiner*—Stephen F. Gerrity
(74) *Attorney, Agent, or Firm*—Rupert B. Hurley, Jr.

(57) ABSTRACT

A heat-shrinkable multilayer film comprises (A) a first layer, which is an outer layer, and which comprises polyolefin; (B) a second layer comprising at least one member selected from the group consisting of polyolefin, polystyrene, and polyurethane; (C) a third layer comprising at least one member selected from the group consisting of amorphous polyester and polyester having a melting point of from about 130° C. to about 260° C.; (D) a fourth layer, which is an outer layer, the fourth layer comprising at least one member selected from the group consisting of polyester, polyamide and polyurethane. The first layer preferably serves as a seal layer in a heat-shrinkable bag. The third layer provides enhanced impact strength, optics, grease-resistance, and free-shrink of the film, and renders the tape more easily orientable. The high melting polyester, polyamide, and/or polyurethane of the fourth layer permits at least two bags, having product therein, to be stacked on top of one another and sealed simultaneously, without sticking to one another, thereby doubling the output of a vacuum chamber machine. A bag and a process of making a packaged product are also disclosed.

30 Claims, 5 Drawing Sheets

U.S. PATENT DOCUMENTS

| | | | |
|---|---|---|---|
| 4,274,900 A | 6/1981 | Mueller et al. | |
| 4,278,738 A | 7/1981 | Brax et al. | |
| 4,469,742 A | 9/1984 | Oberle et al. | |
| 4,541,224 A * | 9/1985 | Mugnai | 53/434 |
| 4,654,240 A | 3/1987 | Johnston | |
| 4,732,795 A | 3/1988 | Ohya et al. | |
| 4,851,245 A | 7/1989 | Hisazumi et al. | |
| 4,855,183 A | 8/1989 | Oberle | |
| 4,879,124 A | 11/1989 | Oberle | |
| 4,879,430 A | 11/1989 | Hoffman | |
| 4,883,693 A | 11/1989 | Ohya et al. | |
| 4,911,979 A | 3/1990 | Nishimoto et al. | |
| 4,963,426 A | 10/1990 | Nishimoto et al. | |
| 4,977,022 A | 12/1990 | Mueller | |
| 5,002,782 A | 3/1991 | Oberle | |
| 5,044,142 A | 9/1991 | Gianelli | |
| 5,053,259 A | 10/1991 | Vicik | |
| 5,068,136 A | 11/1991 | Yoshida et al. | |
| 5,079,051 A | 1/1992 | Garland et al. | |
| 5,086,924 A | 2/1992 | Oberle | |
| 5,206,075 A | 4/1993 | Hodgson, Jr. | |
| 5,213,900 A | 5/1993 | Friedrich | |
| 5,241,031 A | 8/1993 | Mehta | |
| 5,258,230 A | 11/1993 | LaFleur et al. | |
| 5,272,236 A | 12/1993 | Lai et al. | |
| 5,278,272 A | 1/1994 | Lai et al. | |
| 5,336,549 A | 8/1994 | Nishimoto et al. | |
| 5,482,770 A | 1/1996 | Bekele | |
| 5,524,418 A | 6/1996 | Thompson | |
| 5,534,277 A | 7/1996 | Ramesh et al. | |
| 5,539,078 A | 7/1996 | Burkett et al. | |
| 5,562,958 A | 10/1996 | Walton et al. | |
| 5,594,092 A | 1/1997 | Burkett et al. | |
| 5,604,043 A | 2/1997 | Ahlgren | |
| 5,612,423 A | 3/1997 | Burkett et al. | |
| 5,677,383 A | 10/1997 | Chum et al. | |
| 5,820,956 A * | 10/1998 | Hatakeyama et al. | 428/36.6 |
| 5,837,358 A * | 11/1998 | Bauer et al. | 428/213 |
| 5,843,502 A * | 12/1998 | Ramesh | 426/127 |
| 6,146,726 A | 11/2000 | Yoshii et al. | |
| 6,221,410 B1 * | 4/2001 | Ramesh et al. | 426/105 |
| 6,282,869 B1 * | 9/2001 | Bullock et al. | 53/434 |
| 6,302,027 B1 * | 10/2001 | Compton et al. | 102/323 |
| 6,667,082 B2 * | 12/2003 | Bamore et al. | 428/34.8 |

FOREIGN PATENT DOCUMENTS

| | | |
|---|---|---|
| EP | 0 288 972 | 11/1988 |
| EP | 0 597 502 | 5/1994 |
| EP | 0 600 425 | 6/1994 |
| EP | 0 707 957 | 4/1996 |
| EP | 0 476 836 | 11/1996 |
| GB | 2 067 131 | 7/1981 |
| JP | 55-3137 | 1/1980 |
| JP | 58-175658 | 10/1983 |
| JP | 60-232948 | 11/1985 |
| JP | 1-247160 | 10/1989 |
| WO | WO 90/03414 | 4/1990 |
| WO | WO 93/03093 | 2/1993 |
| WO | WO 97/49293 | 12/1997 |

OTHER PUBLICATIONS

ASTM D-1003, "Standard Test Method for Haze and Luminous Transmittance of Transparent Plastics", pp. 197-201, Feb. 15, 1995.
ASTM D-1238, "Standard Test Method for Flow Rates of Thermoplastics by Extrusion Plastometer", pp. 250-258, Nov. 10, 1995.
ASTM D-2457, "Standard Test Method for Specular Gloss of Plastic Films and Solid Plastics", pp. 11-15, Jan. 10, 1997.
ASTM D-2732, "Standard Test Method for Unrestrained Linear Thermal Shrinkage of Plastic Film and Sheeting", pp. 368-371, Jul. 29, 1983.
ASTM D-2838, "Standard Test Method for Shrink Tension and Orientation Release Stress of plastic Film and Thin Sheeting", pp. 119-122, Nov. 10, 1995.
ASTM D-3410, "Standard Test Method for Compressive Properties of Polymer Matrix Composite Materials with Unsupported Gage Section by Shear Loading", pp. 1-16, Sep. 10, 1995.
ASTM D-3763, "Standard Test Method for High-Speed Puncture Properties of Plastics Using Load and Displacement Sensors", pp. 174-178, Jul. 25, 1986.
Journal of Polymer Science, "Determination of Branching Distributions in Polyethylene and Ethylene Copolymers", Wild et al., vol. 20, pp. 411-455 (1982).
Journal of Plastic Film and Sheeting, "Optical Properties of Packaging Materials", Leroy Pike, vol. 9, Jul. 1993, pp. 173-181.
Office Action, May 6, 1999, Restriction/Election 5 pages.
Election, Jun. 3, 1999, 3 pages.
Office Action, Jul. 30, 1999, 15 pages.
Amendment, Jan. 25, 2000, 9 Pages.
Office Action, Apr. 13, 2000, 16 Pages.
Preliminary Amendment, Oct. 11, 2000, 7 Pages.
Office Action, Jan. 4, 2001, 10 Pages.
Amendment, May 4, 2001, 7 Pages.
Office Action, Jul. 9, 2001, 10 Pages.
Notice of Appeal, Jan. 8, 2002, 1 Page.
notice of Abandonment, Sep. 20, 2002, 2 Pages.
Amendment(Pet.to Rev.), Dec. 13, 2002, 8 Pages.

* cited by examiner

HEAT-SHRINKABLE MULTILAYER PACKAGING FILM COMPRISING INNER LAYER COMPRISING A POLYESTER

CROSS REFERENCE TO RELATED APPLICATIONS

This application is a division of U.S. patent application Ser. No. 09/034,836, filed Mar. 4, 1998, now U.S. Pat. No. 6,610,392.

FIELD OF THE INVENTION

The present invention relates to heat-shrinkable films, especially multilayer, heat-shrinkable films suitable for use in the packaging of products. The present invention is also directed to a packaging method using such films.

BACKGROUND OF THE INVENTION

There is a need for multilayer heat-shrinkable films and articles of manufacture made therefrom, which have high impact strength, especially at elevated temperatures, high free shrink at 185° F., high modulus, high gloss and package presentation, good sealability and seal strength, and stack/overlap sealing capability, and which can be easily oriented. This combination of features is not currently available. There is also a strong desire in the marketplace for thin films which also possess the above-described combination of features. The process of downgauging films without sacrificing performance attributes not only utilizes less polymeric material (which is better for the environment) but also lowers the cost to the end-user.

Recently it has been discovered that certain commercially-available bags can be sealed when stacked on top of one another, i.e., without sticking to one another. This non-sticking characteristic provides an advantage for packaging in a vacuum chamber, because the chamber, although typically having only one sealing means, has more than enough space therewithin for multiple bagged products which are to be sealed after evacuation of the atmosphere from the chamber. Thus, the non-sticking feature enables the evacuation and sealing of more than one bag at a time in a vacuum chamber, thereby increasing the production rate of the vacuum chamber packaging apparatus.

U.S. Pat. No. 5,336,549, to Nishimoto et al., discloses a heat-shrinkable film which can be made into bags. Apparently, users of this film, which is commercially available, hive discovered that bags made from the film can be stacked on top of one another during sealing, without sticking to one another (i.e., the bags are "stack-sealable"). This enables the output of vacuum chamber packaging machinery to be, for example, doubled, if two bags are stacked on top of one another and simultaneously sealed.

The film disclosed in the '549 patent has an outer layer of a polyester, and an intermediate layer of a polyamide having a melting point of higher than 160° C. and lower than 210° C. Although Nishimoto et al discloses a large group of polyamides for use in an inner layer, together with various polyesters for use in an outer layer, Nishimoto does not disclose the use of an inner layer comprising polyester.

SUMMARY OF TIE INVENTION

We have discovered films which can provide a combination of desirable characteristics: high impact strength, especially at elevated temperatures, high free shrink at 185° F., high modulus, high gloss and package presentation, good sealability and seal strength, and stack/overlap sealing capability. Moreover, in the process of making these films, the orientation step is not difficult. In addition, films in accordance with our invention can be made significantly thinner than prior art polyolefinic films and still possess comparable or superior performance attributes.

Moreover, we have discovered that at least the film of Example 1, below, which is in accordance with the present invention, exhibits one or more of the following advantages over heat-shrinkable films which are predominantly polyolefinic: a higher impact strength at both room temperature and elevated temperature, superior optics (e.g., gloss and haze), and, superior grease-resistance.

Furthermore, it has also been discovered that it is not difficult to orient a cast tape in the process of making the heat-shrinkable film in accordance with our invention. Orientation can be carried out to a high degree, versus prior art films which comprise an inner polyamide layer having a high melting point. The ease of orientability and wider orientation window provided by the films of this invention also result in a stable orientation process. While the film of our invention can also provide high total free shrink, the process of orientation at a lower temperature can also enhance the free shrink of our multilayer film. Furthermore, the films of this invention can be made so that they are relatively free of optical defects (such as die-lines), versus films comprising a polyamide with a high melting point, i.e., greater than 160° C. (e.g., polyamide 6, polyamide 66, polyamide 6166, polyamide 6.6/6.10, polyamide 12, etc.). The use of an inner layer comprising polyester and an outer layer comprising a polyester is especially preferred in the films of this invention. The use of a polyester is also preferred in the films of this invention because it is significantly less expensive than a polyamide.

In the packaging of a relatively rigid product which is not distorted by forces produced by a shrinking film, it is generally desirable to provide a heat-shrinkable packaging film with as high a free-shrink as possible, in order to provide the "tightest" possible packaging over the product. In general, a tighter package provides a superior appearance, all other factors remaining the same. Our film has a relatively high free shrink, thereby enabling improved product appearance over a film having a lower free shrink.

As a first aspect, the present invention is directed to a heat-shrinkable multilayer film comprising: (A) a first layer, which is an outer layer, and which comprises polyolefin; (B) a second layer comprising at least one member selected from the group consisting of polyolefin, polystyrene, and polyurethane; (C) a third layer comprising at least one member selected from the group consisting of amorphous polyester and polyester having a melting point of from about 130° C. to about 260° C.; and (D) a fourth layer, which is an outer layer, the fourth layer comprising at least one member selected from the group consisting of polyester, polyamide and polyurethane.

Preferably, the film has a total free shrink, at 185° F., of from about 40 to about 170 percent; more preferably, from about 50 to about 150 percent; more preferably, from about 60 to about 130 percent; more preferably, from about 65 to about 110 percent; more preferably, from about 70 to about 100 percent; and, more preferably, from about 75 to about 95 percent.

Preferably, the film has a thickness uniformity of at least 20 percent; more preferably, at least 30 percent; still more preferably, at least 40 percent; yet still more preferably, at least 50 percent; even yet still more preferably, at least 60 percent; still more preferably, at least 70 percent; still more preferably, at least 80 percent; and, still more preferably, at least 85 percent.

Preferably, the third layer comprises an amorphous polyester.

The fourth layer comprises at least one member selected from the group consisting of amorphous polyester and polyester having a melting point of from about 130° C. to about 260° C. If the fourth layer comprises a polyester having a melting point (i.e., a non-amorphous polyester), preferably this polyester has a melting point of from about 150° C. to about 250° C.; even more preferably, from about 170° C. to about 250° C.; still more preferably, from about 180° C. to about 240° C.; still more preferably, from about 190° C. to about 240° C.; still more preferably, from about 200° C. to about 240° C.; and yet still more preferably, from about 210 to about 235° C. Preferably, the polyester in the fourth layer comprises from about 70 to about 95 mole percent terephthalate mer units; more preferably, from about 80 to about 95 mole percent terephthalate mer units; still more preferably, from about 85 to about 90 mole percent terephthalate mer units.

In yet another preferred embodiment, preferably the fourth layer comprises at least one member selected from the group consisting of amorphous polyamide and/or polyamide having a melting point of from about 130° C. to about 260° C. If the fourth layer comprises a polyamide having a melting point (i.e., a non-amorphous polyamide), preferably this polyamide has a melting point of from about 150° C. to about 260° C.; even more preferably, from about 170° C. to about 250° C.; still more preferably, from about 180° C. to about 240° C.; still more preferably, from about 190° C. to about 240° C.; still more preferably, from about 200° C. to about 240° C.; and yet still more preferably, from about 210 to about 235° C.

Preferably, the film has a gloss of at least 50 percent, as measured against the fourth layer by ASTM D2457 (hereby incorporated in its entirety, by reference thereto); more preferably, the gloss is at least about 55 percent; more preferably, at least about 60 percent; more preferably, at least about 65 percent; more preferably, at least about 70 percent; and still more preferably, at least about 75%. Preferably, the film has a haze of no more than 10 percent, as measured by ASTM D 1003 (hereby incorporated, in its entirety, by reference thereto); more preferably, a haze of from about 0 to about 7 percent; still more preferably, from about 0 to about 5 percent.

Preferably, the film has a total thickness of from about 0.5 to about 10 mils; more preferably, from about 1 to about 5 mils; more preferably, from about 1.3 to about 4 mils; still more preferably, from about 1.5 to about 3.5 mils; yet still more preferably, from about 1.8 to about 2.5 mils.

Preferably, the film further comprises a fifth layer which serves as an $O_2$-barrier layer, the fifth layer comprising at least one member selected from the group consisting of EVOH, PVDC, polyalkylene carbonate, polyamide, and polyethylene naphthalate. Preferably, the fifth layer is between the third layer and the fourth layer.

Preferably, the film further comprises a sixth layer which comprises at least one member selected from the group consisting of polyester and polyamide, wherein the sixth layer is between the fourth layer and the fifth layer. More preferably, the film further comprises a seventh layer which is a tie layer, the seventh layer being between the second layer and the third layer, and an eighth layer which is also a tie layer, the eighth layer being between the fourth layer and the sixth layer.

Preferably, the first layer comprises ethylene/alpha-olefin copolymer, the second layer comprises ethylene/vinyl acetate copolymer, the third layer comprises polyethylene terephthalate, the fourth layer comprises polyethylene terephthalate, and the fifth layer comprises EVOH. More preferably, the first layer comprises a blend of homogeneous ethylene/alpha-olefin copolymer and heterogeneous ethylene/alpha-olefin copolymer.

Preferably, the second layer is between the first layer and the third layer, the third layer is between the second layer and the fifth layer, and the fifth layer is between the third layer and the fourth layer.

Preferably, the first layer has a thickness of from about 1 to about 60 percent (more preferably, from about 10 to about 30 percent), based on total film thickness; the second layer has a thickness of from about 1 to about 50 percent (more preferably, from about 5 to about 25 percent), based on total film thickness; the third layer has a thickness of from about 5 to about 40 percent (more preferably, from about 10 to about 25 percent), based on total film thickness; the fourth layer has a thickness of from about 1 to about 40 percent (more preferably, from about 4 to about 20 percent), based on total film thickness; the fifth layer has a thickness of from about 1 to about 20 percent, based on total film thickness (more preferably, from about 5 to about 15 percent). Preferably, the film comprises a crosslinked polymer network.

Preferably, the film has an impact strength, as measured by ASTM 3763 (hereby incorporated by reference thereto, in its entirety), of at least about 60 Newtons (N); more preferably, from about 60 to about 500 N; yet more preferably, from about 70 to about 500 N; yet still more preferably, from about 80 to about 500 N; more preferably, from about 90 to about 500 N; more preferably, from about 100 to about 500 N; more preferably, from about 110 to about 500 N; more preferably, from about 120 to about 500 N.

Preferably, the film has an impact strength (peak load) at 190° F. (88° C.), as measured by ASTM 3763 conducted at 88° C., of at least about 10 pounds (i.e., lbf or poundforce); more preferably, from about 10 to about 150 pounds; more preferably, from about 12 to about 100 pounds; more preferably, from about 14 to about 75 pounds; more preferably, from about 16 to about 60 pounds; more preferably, from about 18 to about 50 pounds; and more preferably, from about 20 to about 40 pounds.

As a second aspect, the present invention pertains to a bag made from the film according to the first aspect of the present invention. Preferably, the bag is made from a preferred film according to the first aspect of the present invention. Preferably, the bag is produced by sealing the first layer to itself, whereby the first layer is an inside bag layer and the fourth layer is an outside bag layer. Preferably, the bag is made from a preferred film according to the first aspect of the present invention. The bag can be an end-seal bag, a side-seal bag, an L-seal bag (i.e., sealed across the bottom and along one side, with an open top), or a pouch (i.e., sealed on three sides, with an open top).

As a third aspect, the present invention is directed to a process for packaging a product, comprising the steps of: (A) placing a first product into a flexible, heat-shrinkable bag which is in accordance with the second aspect of the present invention; (B) repeating the placing step with a second product and a second bag, whereby a second bagged product results; (C) stacking at least the first and second bagged products so that an excess bag length of each of the bagged products are within a sealing distance of a means for heat-sealing; and (D) heat-sealing the inside layer of first bag to itself in the region between the open end of the first bag and the first product, and the inside layer of the second bag to itself in the region between the open end of the second bag and the second product, so that the first product is completely sealed within the first bag and the second product is completely sealed with the second bag. The sealing is carried out at a temperature so that the resulting packaged products can be freely separated from one another without layer delamination. The bag has an open top so that prior to sealing, both the first bagged product and the second bagged product have excess bag length. During sealing of each bag, the first layer is sealed to itself, as the first layer is the inside layer in both the first bag and the second bag. Likewise, the fourth layer is the outside layer of the first bag and the second bag. The process can be carried out in a continuous, single, dual, or rotary chamber vacuum packaging machine. Preferably, from 2 to 5 bagged products are stacked on top of one another during heat-sealing. Preferably, the process utilizes a preferred bag in accordance with the present invention.

DETAILED DESCRIPTION OF THE INVENTION

Figure 1:
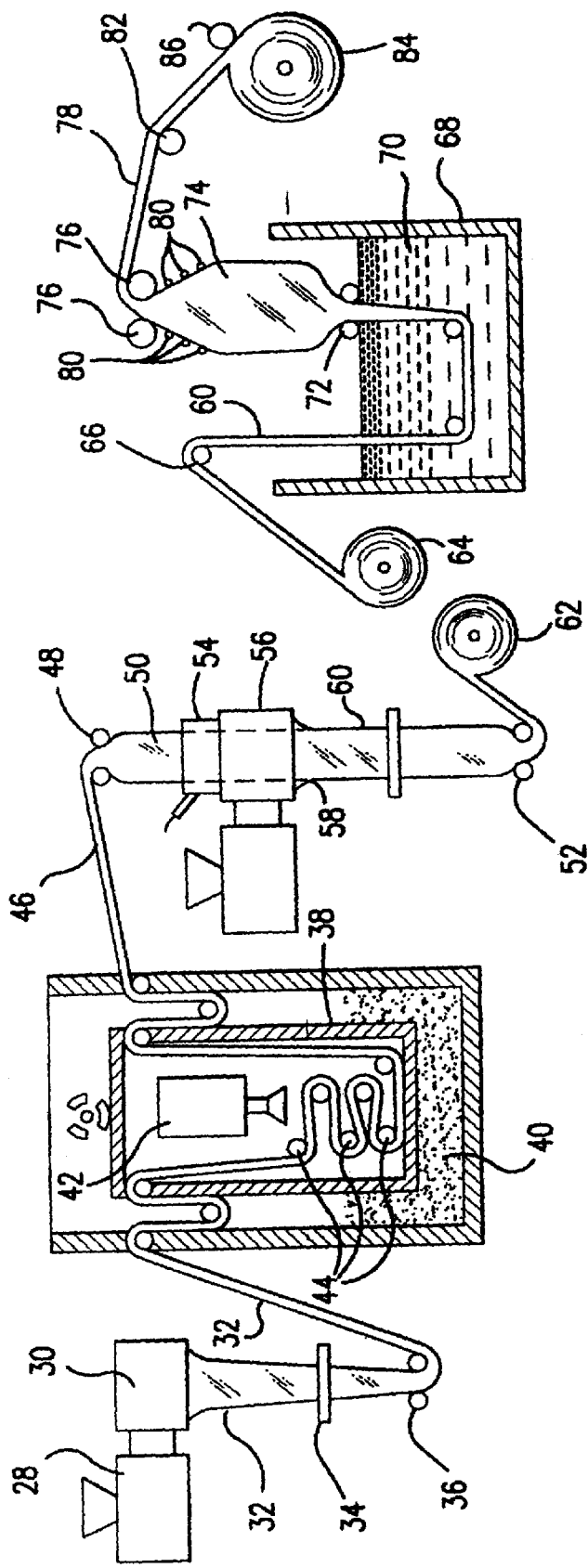
FIG. 1 illustrates a schematic view of a first preferred process for making a multilayer film in accordance with the present invention.

As used herein, the phrase "free shrink" refers to the percent dimensional change in a 10 cm×10 cm specimen of film, when subjected to selected heat (i.e., at a certain temperature), with the quantitative determination being carried out according to ASTM D 2732, as set forth in the 1990 *Annual Book of ASTM Standards*, Vol. 08.02, pp.368–371, which is hereby incorporated, in its entirety, by reference thereto.

The multilayer film according to the present invention preferably has a total free shrink of at least 40 percent at 185° F. "Total free shrink" is determined by summing the percent free shrink in the machine direction with the percentage of free shrink in the transverse direction. For example, a film which exhibits, at 185° F., 50% free shrink in the transverse direction and 40% free shrink in the machine direction, has a "total free shrink" at 185° F. of 90%. It should be noted, however, the film does not have to have shrinkage in both directions. Unless specified otherwise, the phrase "free shrink", as used herein, refers to total free shrink. Preferably, the multilayer film of the present invention has a total free shrink at 185° F. of from 40 to about 170 percent; more preferably, from about 50 to about 150 percent; more preferably, from about 60 to about 130 percent; more preferably, from about 65 to about 110 percent; more preferably, from about 70 to about 100 percent; and, more preferably, from about 75 to about 95 percent.

Preferably, the film has a gloss (as measured by ASTM D2457) of at least 50% (preferably, from about 50 to about 90%), more preferably 60% (preferably, from about 60 to about 90%), more preferably 65% (preferably, from about 65% to about 90%), more preferably 70% (preferably, from about 70% to about 90%), and more preferably 75% (preferably, from about 75% to about 90%).

The percent haze of film is determined by subjecting the film to analysis by ASTM D1003. This method is described in detail in 1990 *Annual Book of ASTM Standards*, Section 8, Vol. 08.01, ASTM D 1003, "Standard Test Method for Haze and Luminous Transmittance of Transparent Plastics", pp. 358–363, which is hereby incorporated by reference thereto, in its entirety. Haze results were obtained using an XL 211 HAZEGARD (™) SYSTEM, obtained from the Gardner/Neotec Instrument Division, of Silver Spring, Maryland. This instrument requires a minimum sample size of about 1 square inch. Preferably, the film of the instant invention has a haze of less than 10 percent; more preferably, from 0 to about 9 percent; more preferably, from about 1 to about 8 percent; more preferably, from about 2 to about 7 percent; 0.5 still more preferably, from about 2 to about 6; yet still more preferably, from about 2 to about 5 percent; and yet still more preferably, from about 2 to about 4 percent.

Haze is a measurement of the transmitted light scattered more than 2.5° from the axis of the incident light. It is measured with a meter similar to a total light transmission meter, with the exception that it contains a light trap to absorb light scattered less than 2.5° and regular transmitted light. It is common to measure the total transmitted light first by defeating the light trap and then setting the meter to 100. Then the light trap is allowed to absorb the light scattered less than 2.5° (plus regular transmitted light), and haze is read as a percentage of total transmitted light. Note that the denominator here is total transmitted light $(I_s+I_r)$, not incident light $(I_i)$, as in the measurement of total transmitted light.

The measurement of optical properties of plastic films used in packaging, including the measurement of total transmission, haze, clarity (i.e., total transmission) and gloss, is discussed in detail in Pike, LeRoy, "Optical Properties of Packaging Materials", *Journal of Plastic film & sheeting*, Vol. 9, No. 3, pp. 173–180 (July 1993), which is hereby incorporated by reference thereto, in its entirety.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that in general, up to the outer 3 mils of a film can be involved in the sealing of the film to itself or another layer, the phrase "seal layer," and the like, refer herein only to the outer film layer(s) which is to be heat-sealed to itself, another film, etc. Any inner film layers which contribute to the sealing performance of the film are herein designated as "seal-assist" layers. With respect to packages having only fin-type seals, as opposed to lap-type seals, the phrase "sealant layer" generally refers to the inside layer of a package, the inside layer being an outer film layer which frequently also serves as a food contact layer in the packaging of foods. However, in a multilayer film, the composition of the other layers (within 3 mils of the inside surface) can also affect sealability and seal strength.

In general, sealant layers employed in the packaging art have included the genus of thermoplastic polymer, including thermoplastic polyolefin polyamide, polyester, polyvinyl chloride, and ionomer. Preferred polymers for the sealant layer include homogeneous ethylene/alpha-olefin copolymer, ethylene/vinyl acetate copolymer, and ionomer.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

As used herein, the term "barrier", and the phrase "barrier layer", as applied to films and/or layers, is used with reference to the ability of a film or layer to serve as a barrier to one or more gases. In the packaging art, oxygen (i.e., gaseous $O_2$) barrier layers have, in general, included, for example, ethylene/vinyl alcohol copolymer (polymerized ethylene vinyl alcohol), polyvinylidene chloride (PVDC), polyalkylene carbonate, polyamide, polyethylene naphthalate, polyester, polyacrylonitrile, etc., as known to those of skill in the art. However, in the present invention the $O_2$-barrier layer preferably comprises either EVOH or polyvinylidene chloride, the PVDC comprising a thermal stabilizer (i.e., HCl scavenger, e.g., epoxidized soybean oil) and a lubricating processing aid, which, for example, comprises one or more acrylates.

As used herein, the phrases "abuse layer", as well as the phrase "puncture-resistant layer", refer to any film layer which serves to resist abrasion, puncture, and other potential causes of reduction of package integrity, as well as potential causes of reduction of package appearance quality. As used herein, the phrase "skin layer" refers to an outside layer of a multilayer film in packaging a product, this skin layer being subject to abuse.

As used herein, the term "core", and the phrase "core layer", as applied to multilayer films, refer to any internal layer which preferably has a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any internal layer having the primary purpose of adhering two layers to one another. In one preferred embodiment, tie layers can comprise any polymer having a polar group grafted thereon, so that the polymer is capable of covalent bonding to polar polymers such as polyamide and ethylene/vinyl alcohol copolymer. Preferred polymers for use in tie layers include, but are not restricted to, ethylene/unsaturated acid copolymer, ethylene/unsaturated ester copolymer, anhydride-grafted polyolefin, polyurethane, and mixtures thereof.

As used herein, the phrase "bulk layer" refers to any layer of a film which is present for the purpose of increasing the abuse-resistance, toughness, modulus, orientability, etc., of a multilayer film. Bulk layers generally comprise polymers which are inexpensive relative to other polymers in the film.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, the phrase "thickness uniformity" refers to percent value obtained by measuring the maximum and minimum thickness of the film and applying these numbers to the following formula:

$$\text{Thickness Uniformity}(\%) = 100 - \frac{\text{film thickness}_{(max)} - \text{film thickness}_{(min)}}{\text{film thickness}_{(max)}} \times 100.$$

The maximum and minimum thicknesses are determined by taking a total of 10 thickness measurements at regular distance intervals along the entirety of the transverse direction of a film sample, recording the highest and lowest thickness values as the maximum and minimum thickness values, respectively, and computing the thickness uniformity (a percent value) using the formula above. A thickness uniformity of 100% represents a film of absolute thickness uniformity, i.e., no measurable differences in thickness; in contrast, a film in which the film thickness (min) is measured at 45% of the film thickness (max) has a thickness uniformity of only 45%.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50%, and more preferably, at least 85%. Preferably, the EVOH comprises from about 28 to about 48 mole % ethylene, more preferably, from about 32 to about 44 mole % ethylene, and even more preferably, from about 38 to about 44 mole % ethylene.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "heat-shrinkable," "heat-shrink," and the like, refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained). Preferably, the heat-shrinkable film has a total free shrink (i.e., machine direction plus transverse direction), as measured by ASTM D 2732, of at least as 5 percent at 185° C., more preferably at least 7 percent, still more preferably, at least 10 percent, and, yet still more preferably, at least 20 percent.

The multilayer films of the invention can be annealed or heat-set to reduce the free shrink either slightly, substantially or completely.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft block, etc. In general, the polymers in the films used in accordance with the present invention can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

For addition polymers, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mers" derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (™) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to about 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefins. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (™) linear homogeneous ethylene/alpha olefin copolymer resins obtainable from the Exxon Chemical Company, of Baytown, Texas, and TAFMER (™) linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (™) resins, are also included as another type of homogeneous ethylene/alpha-olefin copolymer useful in the present invention.

In general, the ethylene/alpha-olefin copolymer comprises a copolymer resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

At least a portion of the multilayer film of the present invention is preferably irradiated to induce crosslinking. In the irradiation process, the film is subjected to one or more energetic radiation treatment, such corona discharge, plasma, flame, ultraviolet, X-ray, gamma ray, beta ray, and high energy electron treatment, each of which induce crosslinking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film. Preferably, the film is irradiated at a level of from about 30 kGy to about 207 kGy, more preferably from about 30 kGy to about 140 kGy. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. The films of this invention can be corona-treated in a preferred embodiment.

Preferably, the film according to the present invention comprises a total of from 4 to 20 layers; more preferably, from 4 to 12 layers; and still more preferably, from 5 to 9 layers. The multilayer film of the present invention can have any total thickness desired, so long as the film provides the desired properties for the particular packaging operation in which the film is used, e.g. optics, modulus, seal strength, etc.

The multilayer film according to the present invention comprises 4 layers. The first layer comprises at least one polyolefin; more preferably, at least one member selected from the group consisting of polyethylene homopolymer, polyethylene copolymer, polypropylene homopolymer, polypropylene copolymer, polybutene homopolymer, polybutene copolymer; still more preferably, at least one member selected from the group consisting of ethylene/alpha-olefin copolymer, ethylene/unsaturated ester copolymer, and ethylene/unsaturated acid copolymer. More preferably, the first layer comprises a homogeneous ethylene/alpha-olefin copolymer. Preferably, the ethylene/alpha-olefin copolymer has a density of less than 0.930 g/cc (preferably, from about 0.86 to less than 0.930, more preferably, from about 0.880 to less than 0.930), more preferably, less than 0.920, more preferably, less than 0.915, more preferably, less than 0.910, more preferably less than 0.905, more preferably, less than 0.903, more preferably, less than 0.900, more preferably, less than 0.898. In general, for the films of the invention, the lower the density of the polyolefin in the seal layer, the better the sealability and resistance to burn-through.

Preferably, the polyolefin in the first layer has a melting point less than about 125° C. (more preferably, from about 50° C. to less than 125° C.; still more preferably, from about 70° C. to less than about 125° C.); more preferably, less than 120° C.; more preferably, less than 115° C.; more preferably, less than 110° C.; more preferably, less than 108° C.; more preferably, less than 105° C.; more preferably, less than 100° C.; more preferably, less than 97° C.; more preferably less than 95° C.; more preferably, less than 93° C., more preferably, less than 90° C.

The first layer can further comprise additional polymer(s) in an amount of from about 5 to about 80 percent, based on layer weight, more preferably from about 10 to about 40% and even more preferably, from about 10 to about 20%. Preferred additional polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

In one preferred embodiment, the first layer comprises a blend of a homogeneous ethylene-alpha olefin copolymer with a heterogeneous ethylene alpha-olefin copolymer. Preferably, the homogeneous ethylene-alpha olefin copolymer has a density less than about 0.910 g/cc (preferably, from about 0.86 to less than about 0.910; more preferably, from about 0.88 to less than about 0.910) and the heterogeneous ethylene-alpha olefin copolymer has a density greater than about 0.910.

Preferably, the polyolefin of the first layer has a melt index of from about 0.3 to about 50 g/10 min; more preferably from about 1 to about 20; still more preferably from about 2 to about 10, even more preferably from about 3 to about 8; and, still more preferably from about 4 to about 6 (as measured by ASTM D1238, which is hereby incorporated, in its entirety, by reference thereto).

Preferably, the first layer has a thickness of from about 0.1 to about 4 mils; more preferably, from about 0.2 to about 1 mil; and, still more preferably, from about 0.3 to about 0.8 mils. Preferably, the thickness of the first layer is from about 1 to about 60 percent of the total thickness of the multilayer film; more preferably, about 5 to about 50%; more preferably, about 10 to about 40%; more preferably, about 15 to about 35%; and even more preferably, about 15 to about 30%. Preferably, the thickness of the first layer is at least 50% of the thickness of the third layer; more preferably, at least 75% of the thickness of the third layer; more preferably, at least 100% of the thickness of the third layer; more preferably, at least 125% of the thickness of the third layer; and, even more preferably, at least 150% of the thickness of the third layer.

In the first layer, the use of a polyolefin with a low melting point (preferably, less than 120° C. {more preferably, from about 70° C. to less than 120° C.; still more preferably, from about 80° C. to less than 120° C.}; more preferably, less than about 110° C., e.g., homogeneous ethylene/alpha olefin copolymers) provides the advantage of ease of sealability of the film, and resistance to burn-through of the film. It is believed that these advantages are realized because the use of a lower melting polyolefin in the seal layer permits the use of a lower sealing temperature and widens the sealing window, thereby reducing the tendency to burn through. Furthermore, the use of a lower sealing temperature enhances the use of this film for applications involving stack/overlap sealing. In addition, the use of a polyolefin with a low melting point, in combination with an inner layer comprising a polyester, provides the article of manufacture made therefrom with high seal strength. The use of the preferred polyolefins as described in the first layer also enables the film of the invention to be oriented more easily and provide the multilayer film with high free shrink and excellent optics.

The second layer comprises at least one member selected from the group consisting of polyolefin, polystyrene and polyurethane; more preferably, at least one member selected from the group consisting of polyethylene homopolymer, polyethylene copolymer, polypropylene homopolymer, polypropylene copolymer, polybutene homopolymer, polybutene copolymer; even more preferably, at least one member selected from the group consisting of ethylene/alpha-olefin copolymer, ethylene/unsaturated ester copolymer, and ethylene/unsaturated acid copolymer. Still more preferably, the second layer comprises an ethylene-vinyl acetate copolymer. A preferred ethylene/vinyl acetate copolymer comprises from about 3 to about 28% vinyl acetate comonomer, more preferably, from about 5 to about 20% vinyl acetate comonomer, even more preferably, from about 8 to about 18% vinyl acetate copolymer and even yet still more preferably, from about 12 to about 18% vinyl acetate comonomer.

The second layer can further comprise additional polymer in an amount of from about 5 to about 80% based on layer weight, more preferably from about 10 to about 40% and even more preferably, from about 10 to about 20%. Preferred additional polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. The second layer facilitates the orientation process used to produce the film of the invention and also provides the film with excellent free shrink, impact resistance and optics. Optionally, the second layer could also serve as a tie layer.

The polymer of the second layer preferably has a melt index of from about 0.3 to about 50, more preferably from about 1 to about 20, still more preferably from about 1 to about 10, even more preferably from about 1 to about 5, and, still more preferably from about 1 to about 3.

Preferably, the second layer has a thickness of from about 0.05 to about 4 mils; more preferably, from about 0.1 to about 1 mil; and, still more preferably, from about 0.2 to about 0.7 mils. Preferably, the thickness of the second layer is from about 1 to about 50 percent, based on total film thickness; more preferably, from about 5 to about 50 percent; more preferably, from about 8 to about 50 percent; more preferably, from about 10 to about 45 percent; more preferably, from about 13 to about 40 percent; more preferably, from about 15 to about 35 percent; more preferably, from about 17 to about 25 percent; and more preferably, from about 20 to about 25 percent. Preferably, the thickness of the second layer is at least 50% of the thickness of the third layer, more preferably, at least 75% of the thickness of the third layer, more preferably, at least 100% of the thickness of the third layer, more preferably, at least 125% of the thickness of the third layer and even more preferably, at least 150% of the thickness of the third layer.

The third layer comprises a polyester. While the polyester utilized in the third layer could be a homopolymer or a copolymer, preferably the polyester is a copolyester. Preferably, the polyester comprises from about 70 to about 95 mole percent terephthalate mer units; more preferably, from about 80 to about 95 mole percent terephthalate mer units; and still more preferably, from about 85 to about 90 mole percent terephthalate mer units.

Preferably, the polyester has a melting point of from about 130° C. to about 260° C.; more preferably, from about 150° C. to about 250° C.; even more preferably, from about 170° C. to about 250° C.; still more preferably, from about 180° C. to about 240° C.; still more preferably, from about 190° C. to about 240° C.; still more preferably, from about 200° C. to about 240° C.; and, yet still more preferably, from about 210° C. to about 235° C. In another preferred embodiment, the polyester in the third layer is an amorphous polyester (i.e., has no crystallinity or relatively low crystallinity). Examples of suitable polyesters include PET homopolymer, PET copolymer, PEN homopolymer, and PEN copolymer.

The use of a polyester in the third layer, in conjunction with an outer layer comprising at least one member selected from the group consisting of polyester, polyamide, polypropylene and polyurethane, provides certain unexpected results when compared to the use of polyolefins or polyamides with high melting points (i.e., melting points greater than 160° C.) in the third layer. For example, it has been discovered that in the multilayer film of the invention, the use of an inner layer comprising a polyester, in conjunction with an outer layer comprising polyester: increases the impact strength of the film at room temperature; increases the impact strength of the film at elevated temperatures, relative to the impact strength of films which are predominantly polyolefinic; provides superior film optics; and provides superior grease-resistance. Furthermore, it has also been discovered that the films of this invention: are easier to orient; and can be oriented to a higher degree, when compared to other films, especially those comprising an inner polyamide layer having a high melting point. The ease of orientability and wider orientation window provided the films of this invention also result in a more stable orientation process. Additionally, the films of this invention can also be oriented at a lower temperature than films comprising an inner layer comprising a polyamide with a high melting point, e.g. polyamide 6. While the composition of the films of this invention also provide higher free shrink, the process of orientation at a lower temperature also enhances the free shrink of the multilayer films of this invention. Furthermore, the films of this invention are also relatively free of optical defects (such as die-lines), versus films comprising an inner layer comprising a polyamide with a high melting point, i.e., greater than 160° C. (e.g., polyamide 6). Furthermore, the use of a polyester facilitates the incorporation and orientation of thicker layers of polyester, thereby providing superior impact strength (as compared to films comprising an inner layer comprising a high melting polyamide).

Preferably, the third layer has a thickness of from about 5 to about 40 percent, based on the total thickness of the multilayer film; more preferably, from about 7 to about 30 percent; more preferably, from about 10 to about 28 percent; more preferably, from about 12 to about 26 percent; and more preferably, from about 18 to about 25 percent. If the thickness of the third layer is less than about 5% of the total thickness of the multilayer film, the film exhibits a less-than-preferred impact strength, toughness, and puncture resistance. On the other hand, if the thickness of the third layer is greater than about 40% of the total thickness of the multilayer film, the film has a shrink and clarity which are less-than-preferred; moreover, the tape, from which the film is made, becomes more difficult to orient. Preferably, the third layer has a thickness of from about 0.05 to about 2 mils; more preferably, from about 0.1 to about 1 mil; still more preferably, from about 0.2 to about 0.8 mil; yet still more preferably, from about 0.2 to about 0.4 mil; and, even yet still more preferably, from about 0.2 to about 0.3 mil.

The fourth layer comprises at least one member selected from the group consisting of polyester, polyamide, polypropylene and polyurethane. Preferably, the polyester has a melting point of from about 130° C. to about 260° C.; more preferably, from about 150° C. to about 250° C.; even more preferably from about 170° C. to about 250° C.; still more preferably, from about 180° C. to about 240° C.; still more preferably, from about 190° C. to about 240° C.; still more preferably, from about 200° C. to about 240° C.; and yet still more preferably, from about 210° C. to about 235° C. For applications requiring stack sealability, higher melting point polyester is preferred. Preferably, the higher melting point polyester comprises polyester having a terephthalic acid mer content of at least 75 mole percent; more preferably, at least 80 mole percent; more preferably, at least 85 mole percent; and even more preferably, at least 90 mole percent. In another preferred embodiment, the polyester in the fourth layer is an amorphous polyester, more preferably, an amorphous copolyester.

While the polyester utilized in the fourth layer could be a homopolymer or a copolymer, preferably, the polyester is a copolyester. Preferably, the polyester comprises from about 70 to about 95 mole percent terephthalate mer units; more preferably, from about 80 to about 95 mole percent terephthalate mer units; and still more preferably, from about 85 to about 90 mole percent terephthalate mer units. For applications requiring overlap sealability, polyester having a higher mole percent of terephthalate mer units is preferred. Examples of suitable polyester include PET homopolymer, PET copolymer, PEN homopolymer, and PEN copolymer.

In another preferred embodiment, the fourth layer comprises polyamide. Preferably, the polyamide comprises at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof. Preferably, the polyamide has a melting point of from about 130° C. to about 235° C.; more preferably, from about 150° C. to about 235° C.; more preferably, from about 170° C. to about 235° C.; more preferably, from about 180° C. to about 235° C.; and more preferably from about 195° C. to about 235° C. In another preferred embodiment, the fourth layer comprises a polypropylene; preferably a polypropylene copolymer; more preferably, a polypropylene copolymer comprising at least 70% propylene mer; more preferably, from about 70 to about 99% propylene mer; more preferably, from about 80 to about 99% propylene mer; more preferably, from about 85 to about 99% propylene mer; more preferably, from about 90 to about 99% propylene mer; and more preferably, from about 94 to about 99% propylene mer. Preferably, the polypropylene has a melting point of at least 120° C., more preferably, from about 120° C. to about 160° C.; more preferably, from about 130° C. to about 150° C.; and even more preferably, from about 135° C. to about 145° C. In another preferred embodiment, the fourth layer comprises a polyurethane, preferably having a melting point of at least 120° C.

Preferably, the fourth layer has a thickness of from about 0.05 to about 4 mils; more preferably, from about 0.1 to about 1 mil; and, still more preferably, from about 0.2 to about 0.8 mils. Preferably, the thickness of the fifth layer is from about 1 to about 30 percent of the total thickness of the multilayer film; more preferably, from about 4 to about 20 percent; still more preferably, from about 4 to about 16 percent; still more preferably, from about 5 to about 15 percent; and, still more preferably, from about 7 to about 12 percent.

Preferably, the film according to the present invention further comprises a fifth layer which has $O_2$-barrier characteristics. Preferably, the fifth layer has a thickness of from about 0.05 to about 2 mils; more preferably, from about 0.05 to about 0.5 mil; yet still more preferably, from about 0.1 to about 0.3 mil; and even yet still more preferably, from about 0.12 to about 0.17 mils. Preferably, the fifth layer comprises at least one member selected from the group consisting of EVOH, PVDC, polyalkylene carbonate, polyamide, and polyethylene naphthalate; more preferably, EVOH having about 44 mole percent ethylene mer. Preferably, the thickness of the fifth layer is from about 1 to about 25 percent of the total thickness of the multilayer film; more preferably, about 3 to about 18 percent; and, still more preferably, from about 5 to about 15 percent.

Preferably, the film further comprises a sixth layer which has a composition which is similar to or identical with the composition of the third layer, as described above. Optionally or additionally, the sixth layer comprises a polyamide. Preferably, the polyamide comprises at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof.

Preferably, the film further comprises a seventh layer, and more preferably, an eighth layer. The seventh layer and the eighth layer preferably serve as tie layers. The thickness and composition of tie layers used in the films of this invention are as known to those of skill in the art.

Preferably, the third layer and the fourth layer are not adjacent one another. Even more preferably, the multilayer film of this invention has at least one layer between the third layer and the fourth layer, this layer comprising a polymer having a lower modulus than the polyamide or polyester in the third or fourth layers. Preferably, the polymer referred to above, which has a lower modulus than the polyamide or polyester in the third or fourth layer, comprises at least one member selected from the group consisting of polyolefin, polystyrene, polyurethane, EVOH, polyalkylene carbonate, and PVDC. In one preferred example, the layer having a lower modulus than the polyamide or polyester can also serve as a tie layer, or as an $O_2$-barrier layer.

Preferably, the film comprises polyester in an amount of at least 10 percent polyester, based on the total weight of film; more preferably, from about 5 percent to about 60 percent; more preferably, from about 10 percent to about 50 percent; more preferably, from about 15 percent to about 40 percent; more preferably, from about 20 percent to about 40 percent; and even more preferably, from about 25 percent to about 35 percent.

Preferably, the film exhibits a modulus of at least 40,000 psi (more preferably, from about 40,000 to about 250,000 psi); more preferably, at least about 50,000; more preferably, at least about 60,000; more preferably, at least about 70,000; more preferably at least about 80,000; more preferably, at least about 90,000; more preferably, at least about 100,000; more preferably, at least about 110,000; and, more preferably, at least about 120,000 psi. Modulus is measured in accordance with ASTM D 882, the entirety of which is hereby incorporated by reference thereto.

Preferably, the film exhibits a shrink tension in at least one direction of at least 100 psi, more preferably 175 psi; still more preferably, from about 175 to about 500 psi; still more preferably, from about 200 to about 500 psi; more preferably, from about 225 to about 500 psi; more preferably, from about 250 to about 500 psi; more preferably, from about 275 to about 500 psi; more preferably, from about 300 to about 500 psi; and more preferably, from about 325 to about 500 psi. Shrink tension is measured in accordance with ASTM D 2838, the entirety of which is hereby incorporated by reference thereto.

Various combinations of layers can be used in the formation of the multilayer films according to the invention. Only 4-, 5-, and 6-layer preferred embodiments are provided here as illustrations. The multilayer films of the invention can also comprise more layers. Thus, modifications and variations may be utilized without departing from the principles and scope of the invention, as those skilled in the art will readily understand. Given below are some examples of preferred combinations in which the alphabetical symbols used designate the following resin layers: "A" represents a layer comprising polyolefin, preferably as described in the description of the first layer; "B" represents a layer comprising at least one member selected from the group consisting of polyolefin, polystyrene, and polyurethane, preferably as described in the description of the second layer; "C" represents a layer comprising polyester, preferably as described in the description of the third layer; and, "D" represents a layer comprising at least one member selected from the group consisting of polyester, polyamide, polypropylene and polyurethane, preferably as described in the description of the fourth layer.

Various preferred multilayer films can be prepared in accordance with the film and process of the present invention, as follows: A/B/C/D, A/C/B/D, A/B/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B'/D, A/C/B/B'/B"/D, A/C/B/C/B/D, A/C/B/E/B'/D. In any one of these multilayer structures, a plurality of layers (A), (B), and (C) may be formed of the same or different modified compositions.

Preferably, the film is produced by casting an annular tape which is thereafter oriented at least 2.7:1 in at least 1 direction; more preferably, from about 2.7:1 to about 10:1 in at least one direction; still more preferably, at least 2.8:1; still more preferably, at least 2.9:1; yet still more preferably, at least 3.0:1; even yet still more preferably, at least 3.1:1; yet still more preferably, at least 3.2:1 yet still more preferably, at least 3.3:1; yet still more preferably, at least 3.2:4; yet still more preferably, at least 3.5:1; yet still more preferably, at least 3.6:1; and, yet still more preferably, at least 3.7:1. Films comprising polyamide with a melting point greater than 160° C. in the inner layer are difficult to orient at a ratio of about 2.7 to 1 in the transverse direction; above 3.0 orientation becomes even more difficult. However, the films of this invention can be easily oriented at least 3:1 in at least one direction.

FIG. 1 illustrates a schematic view of a first preferred process for making films according to the present invention. As illustrated in FIG. 1, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 10 to 20 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 40 kGy to about 120 kGy.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 46 is passed through vacuum chamber 54, and thereafter forwarded through coating die 56. Annular coating stream 58 is melt extruded from coating die 56 and coated onto slightly inflated, irradiated tube 50, to form two-ply tubular film 60. Coating stream 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is immersed in hot water 70 (preferably, having temperature of about 185° F. to 210° F.) for a period of from about 10 to about 100 seconds, i.e., for a time period in order to bring the film up to the desired temperature for biaxial orientation.

Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5 to about 1:6, and drawn at a ratio of from about 1:1.5 to about 1:6; more preferably, the stretching and drawing are each performed a ratio of from about 1:2 to about 1:4. The result is a biaxial orientation of from about 1:2.25 to about 1:36, more preferably, from about 1:4 to about 1:16. While bubble 74 is maintained between pinch rolls 72 and 76, blown tubing 78 is collapsed by rollers 80, and thereafter conveyed through pinch rolls 76 and across guide roll 82, and then rolled onto wind-up roll 84. Idler roll 86 assures a good wind-up.

Figure 2:
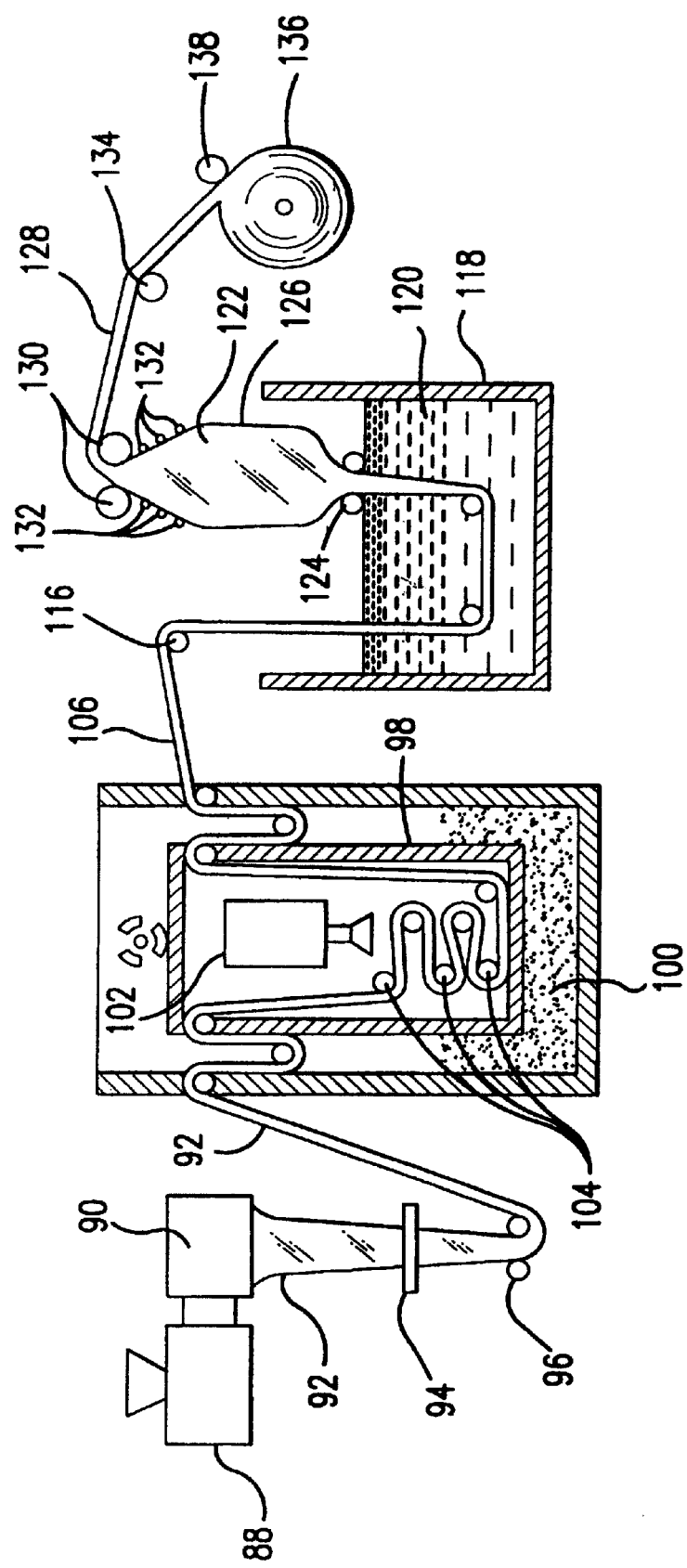
FIG. 2 illustrates a schematic view of a second preferred process for making a multilayer film in accordance with the present invention.

FIG. 2 illustrates a schematic of a second preferred process for making a film in accordance with the present invention. In FIG. 2, solid polymer beads (not illustrated) are fed to a plurality of extruders (for simplicity, only extruder 88 is illustrated). Inside extruders 88, the polymer beads are forwarded, melted, and degassed, following which the resulting bubble-free melt is forwarded into die head 90, and extruded through an annular die, resulting in tubing tape 92 which is preferably from about 10 to 20 mils thick, and preferably has a lay-flat width of from about 2 to 10 inches.

After cooling or quenching by water spray from cooling ring 94, tubing tape 92 is collapsed by pinch rolls 96, and is thereafter fed through irradiation vault 98 surrounded by shielding 100, where tubing 92 is irradiated with high energy electrons (i.e., ionizing radiation) from iron core transformer accelerator 102. Tubing 92 is guided through irradiation vault 98 on rolls 104. Preferably, tubing 92 is irradiated to a level of from about 40 to about 120 kGy, resulting in irradiated tubing 106, which is then passed over guide roll 116, after which irradiated tubing 106 is passed into and through hot water bath tank 118 containing hot water 120. Irradiated tubing 106 is immersed in hot water 120 (preferably having a temperature of about 185 to about 210° F.) for a period of about 10 to about 100 seconds, i.e., for a time period long enough to bring the film up to the desired temperature for biaxial orientation. Thereafter, the resulting hot, irradiated tubing 122 is directed through nip rolls 124, and bubble 126 is blown, thereby transversely stretching hot, irradiated tubular tubing 122 so that an oriented film tube 128 is formed. Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film tube 128 is produced, this blown tubing preferably having been both stretched at a ratio of from about 1:1.5 to about 1:6, and drawn at a ratio of from about 1:1.5 to about 1:6. More preferably, the stretching and drawing are each performed at a ratio of from about 1:2 to about 1:4. The result is a biaxial orientation of from about 1:2.25 to about 1:36, more preferably, from about 1:4 to about 1:16. While bubble 126 is maintained between pinch rolls 124 and 130, oriented film tube 128 is collapsed by rollers 132, and thereafter conveyed through pinch rolls 130 and across guide roll 134, and then rolled onto wind-up roll 136. Idler roll 138 assures a good wind-up. This process can be carried out continuously in a single operation, or intermittently, e.g., as a two-stage process, in which the extruded, irradiated tape is wound up after irradiation, and, after a period of storage, unwound and subjected to heating and orienting in order to arrive at oriented film tubing 128.

Figure 5:
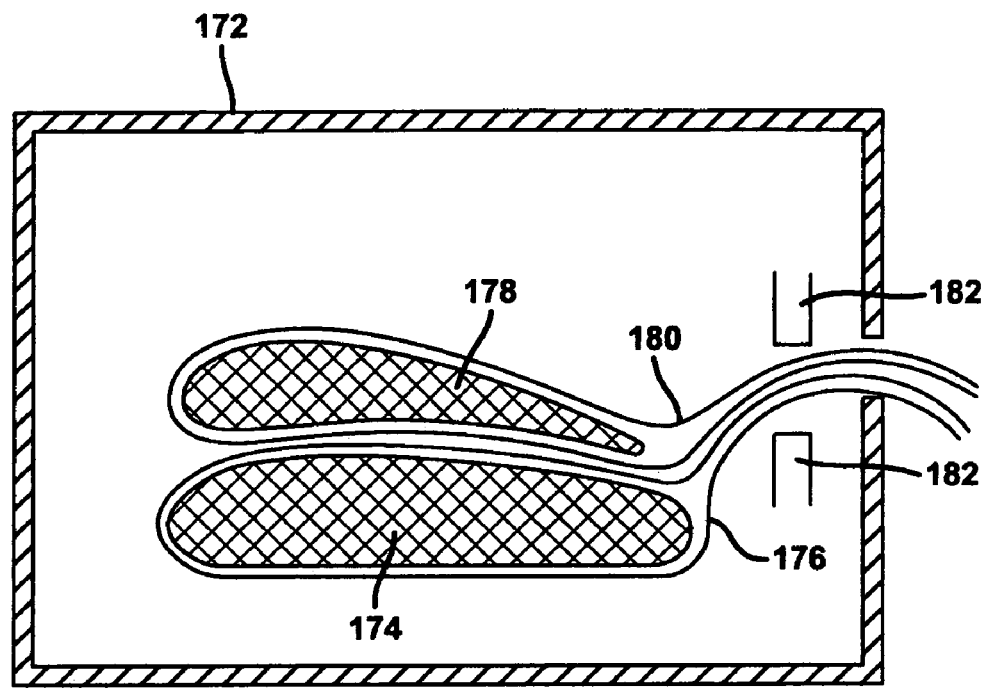
FIG. 5 illustrates a schematic of a stack sealing process.

FIG. 5 is a schematic illustration of a stack sealing process in which vacuum chamber 172 holds first product 174 which has been placed in first bag 176 and second product 178 which has been placed in second bag 180, with the resulting bagged products being stacked on top of one another, with excess bag length of each of first bag 176 and second bag 178 positioned on top of one another and within sealing distance of a means for sealing 182, ready for subsequent evacuation and sealing.

The invention is illustrated by the following examples, which are provided for the purpose of representation, and are not to be construed as limiting the scope of the invention. Unless stated otherwise, all percentages, parts, etc. are by weight.

Film No. 1

A preferred eight-layer, heat-shrinkable multilayer film according to the present invention was produced in a manner as illustrated in FIG. 2, described above. The composition of this film, referred to herein as Film No. 1, is described below and provided in Table 1. Film No. 1 is an example of the multilayer film of the current invention. The first layer was an outer layer and which served as a seal layer, inside bag layer, and product-contact layer; (2) the second layer comprised polyolefin; (3) the third layer comprised a polyester; (4) the fourth layer was an outer layer and comprised a polyester; (5) the fifth layer served as an $O_2$-barrier layer; (6) the sixth layer comprised polyester; (7) the seventh layer served as a tie layer; and (8) the eighth layer served as a tie layer.

TABLE I (Characteristics of Film No. 1)

| Layer Designation | Layer Chemical Identity | Layer Thickness (mils) |
|---|---|---|
| first | 80% homogeneous ethylene/alpha-olefin copolymer; and 20% LLDPE | 0.43 |
| second | EVA | 0.36 |
| seventh | modified EMA | 0.13 |
| third | Polyester #1 | 0.18 |
| fifth | EVOH | 0.13 |
| sixth | Polyester #1 | 0.18 |
| eighth | modified EMA | 0.16 |
| fourth | Polyester #2 | 0.13 |

The layer arrangement was in the order of Table 1, above. The resins identified in the table were as follows:

Homogeneous ethylene/alpha-olefin copolymer was AFFINITY® DPL 1280 long chain branched substantially linear single site catalyzed ethylene/octene copolymer containing 13 weight percent octene mer and having a density of 0.900 g/cc and a melt index of 6.0 grams/min. This resin was obtained from The Dow Chemical Company, of Midland, Mich.

LLDPE was ESCORENE® LL3003.32 linear low density polyethylene having 90 weight percent ethylene mer 10 weight percent hexene mer, having a density of 0.9175 g/cc and a melt index of 3.2 g/min. This resin was obtained from Exxon Chemical Americas, of Houston, Tex.

EVA was PE 5269T ethylene/vinyl acetate copolymer having a vinyl acetate content of 6.5 percent, a melt index of 0.5 g/min, and a density of 0.9315 g/cc. This resin was obtained from the Chevron Chemical Company, of Houston, Tex.

Modified EMA was BYNEL® 2174 anhydride grafted ethylene/methyl acrylate copolymer having a melt index of 2.8 and a density of 0.931 g/cc. This resin was obtained from the Dupont Company, of Wilmington, Del.

Polyester #1 was EASTAR® 6763 PETG polyethylene terephthalate copolyester modified with cyclohexanedimethanol, which had an intrinsic viscosity of 0.74 at 220° C., and which was obtained from Eastman Chemical Company of Kingsport, Tennessee. This is essentially an amorphous polyester.

EVOH was EVAL® LC-E105A ethylene/vinyl alcohol copolymer, and contained 44 mole percent ethylene and had a melting point of 166.5° C. This resin was obtained from Eval Company of America, of Lisle, Ill.

Polyester #2 was SELAR® PT 8307 modified polyester copolymer resin, and had a melting point of 220° C. (as measured by differential scanning calorimetry, according to ASTM 3410), a density of 1.33 g/cc (as measured by differential scanning calorimetry, according to ASTM D1505), and an intrinsic viscosity of 0.71 (measured by the DuPont method). This resin was obtained from the Chevron Chemical Company, of Houston, Tex.

Film No. 1 had a total thickness of 1.7 mils, a peak load impact strength of 117.3 N (at 73° F.), a peak load impact strength of 18.8 lbs (at 190° F.), a total free shrink at 185° F. of 81 percent, a gloss of 77 percent, and a haze of 5.0 percent. Film No. 1 also had a modulus (at 73° F.) of 102,000 psi, significantly higher than that of polyolefinic films. In summary, Film No. 1 had excellent impact strength, high free shrink, and high optics in terms of significantly low haze and high gloss.

Film No. 1 was especially suited to making a bag with the first layer as the inside layer and the eighth layer as the outside layer. Such bags made from Film No. 1 can be stacked on top of one another and simultaneously sealed by a single sealing means, and thereafter further processed, without sticking to one another.

The extrusion and orientation to produce Film No. 1 was surprisingly easy, considering the fact that it had two layers comprising polyester, had good bubble stability and excellent thickness uniformity (greater than 70%). Film No. 1 also had an unexpectedly high impact strength, especially considering its thickness of only 1.7 mils. This was quite unexpected and is believed to be due to the incorporation of two relatively thin layers of polyester as opposed to a single thicker layer. Based on this unexpected result, it is now believed that the incorporation of two discrete layers, one comprising a polyester and the other comprising a polyester, polyamide and/or polyurethane, will provide the films of this invention with the required modulus and also, surprisingly, enhance the impact strength, especially at elevated temperatures. Thus, we get a synergistic affect by separating these layers from one another, preferably through the incorporation of a lower modulus polymer. It was equally surprising that despite using an inner layer comprising a polyester and an outer layer comprising a polyester, the film of this invention had relatively high free shrink. As a result of this surprising discovery, it is now believed that by separating out the two polyester layers in the film of this invention, the polyolefinic layers were allowed to control or decide (determine) the free shrink of the multilayer film. Taking this analogy one step further, the inventors also believe that the same principle could be used for films comprising an inner layer comprising polyester and an outer layer comprising polyamide or polyurethane. While downgauging of films significantly reduces the abuse-resistance and impact strength of films, because of the surprising advantages described above, the multilayer films of the invention can be made in downgauged versions (i.e., thinner), while still providing abuse-resistance and impact strength comparable/superior to other thicker films.

Film No. 2

Film No. 2, another preferred eight-layer, heat-shrinkable multilayer film according to the present invention, can be produced in the same general manner that Film No. 1 was produced. Film No. 2 is of the chemical composition as described in Table 2 and is also characterized by good impact strength, high gloss and high degree of free shrink.

TABLE 2

(Characteristics of Film No. 2)

| Layer Designation | Layer Chemical Identity | Layer Thickness (mils) |
| --- | --- | --- |
| first | 80% homogeneous ethylene/alpha-olefin copolymer; and 20% LLDPE | 0.43 |
| second | EVA | 0.36 |
| seventh | modified EMA | 0.13 |
| third | Polyester #2 | 0.18 |
| fifth | EVOH | 0.13 |
| sixth | Polyester #2 | 0.18 |
| eighth | modified EMA | 0.16 |
| fourth | Polyester #2 | 0.13 |

The layer arrangement is in the order of Table 2, above. The resins specified in Table 2 are as identified above, i.e., below Table 1.

Comparative Film No. 3

Comparative Film No. 3 has been used for the packaging of fresh red meat and is illustrated for comparative purposes. Film No. 3 had the chemical composition as set forth in Table 3, below. Film No. 3 was about 2.0 mils thick and had a peak load impact strength of about 120 Newtons (at 73° F.), a peak load impact strength of about 14 lbs (at 190° F.), a total free shrink at 185° F. of about 80 percent, gloss of about 81%, a haze of about 5%, and a modulus (at 73° F.) of about 32, 600 psi.

TABLE 3

(Characteristics of Film No. 3)

| Layer Designation | Layer Chemical Identity | Layer Thickness (mils) |
| --- | --- | --- |
| first | 80% homogeneous ethylene/alpha-olefin copolymer; and 20% LLDPE | 0.44 |
| second | EVA #2 | 0.90 |
| third | PVDC | 0.18 |
| fourth | 90% EVA #3 and 10% HDPE #1 | 0.48 |

The layer arrangement was in the order of Table 3, above. The resins identified in Table 3 were as follows: Homogeneous ethylene/alpha-olefin copolymer and LLDPE are as identified above, i.e., below Table 1.

EVA#2 was ESCORENE® LD-720.92 ethylene/vinyl acetate copolymer having a vinyl acetate content of 18 percent, a melt index of 1.5 g/min, and a density of 0.940 g/cc. This resin was obtained from Exxon Chemical Americas, of Houston, Tex.

EVA#3 was ESCORENE® LD-318.92 ethylene/vinyl acetate copolymer having a vinyl acetate content of 9 percent, a melt index of 2 g/min, and a density of 0.930 g/cc. This resin was obtained from Exxon Chemical Americas, of Houston, Tex.

PVDC was a PVDC/MA copolymer obtained from The Dow Chemical Company of Midland, Mich.

HDPE#1 was Fortiflex® T60-500-199 high density polyethylene resin with a density of 0.961 g/cc and a melt index of 6.2 g/min. This resin was obtained from Solvay Polymers of Deer Park, Tex.

The film of Example 1 possessed significantly higher impact strength (at an elevated temperature, e.g., 190° F.) than the Comparative Film No. 3, and also significantly higher modulus. However, as can be seen, optical and shrink properties are not compromised by the incorporation of the layers comprising polyesters.

Figure 3:
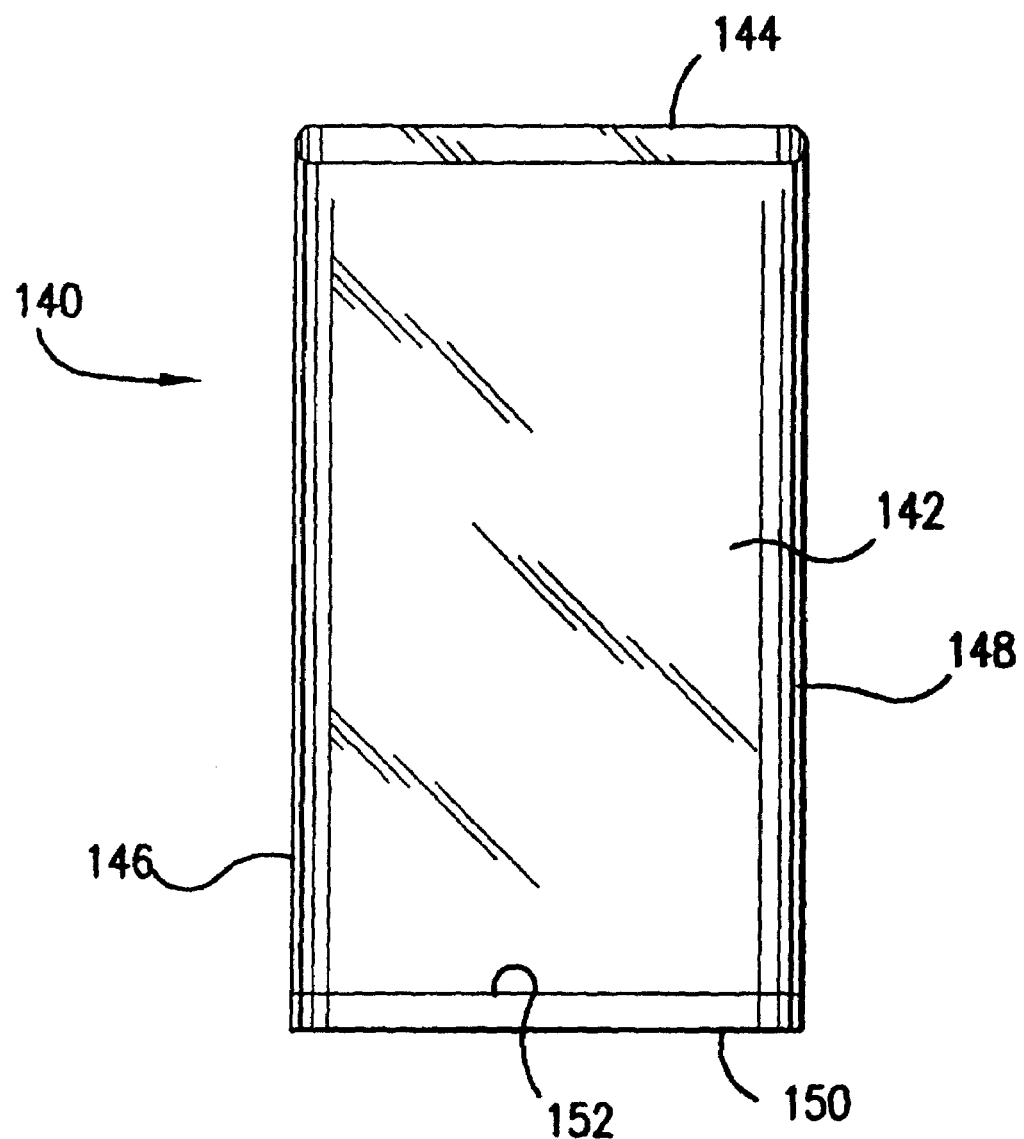
FIG. 3 illustrates a schematic of an end-seal bag in accordance with the present invention, in lay-flat view.

FIG. 3 is a schematic of a preferred end seal bag 140, in a lay-flat position, this bag being in accord with the present invention. Bag 140 comprises bag film 142, top edge 144 defining an open top, first bag side edge 146, second bag side edge 148, bottom edge 150, and end seal 152.

Figure 4:
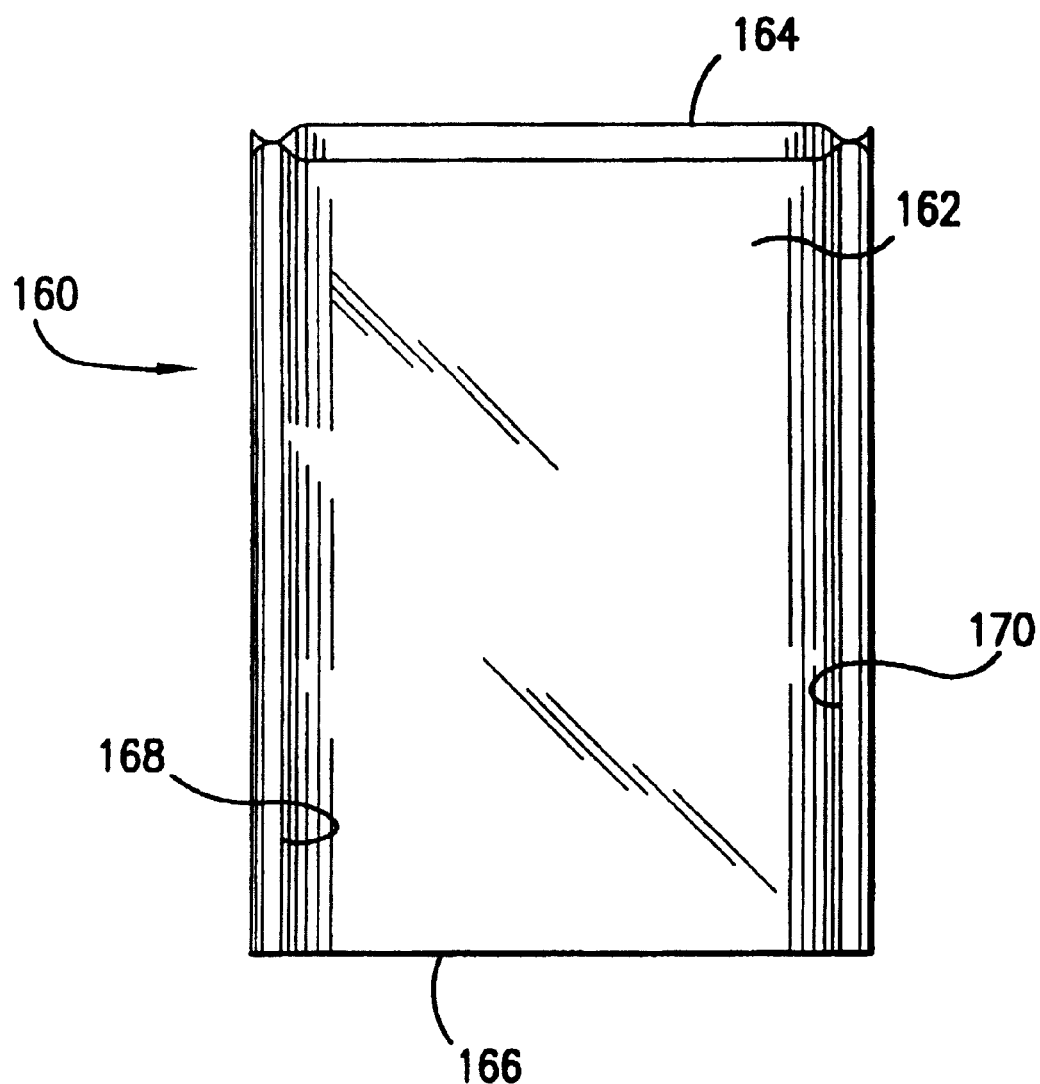
FIG. 4 illustrates a schematic of a side-seal bag in accordance with the present invention, in lay-flat view.

FIG. 4 illustrates side-seal bag 160, an alternative bag according to the present invention. Side seal bag 160 is comprised of bag film 162, top edge 164 defining an open top, bottom edge 166, first side seal 168, and second side seal 170.

Although the bag according to the present invention can be used in the packaging of any product, the bag of the present invention is especially advantageous for the packaging of food products, especially processed meat products and fresh meat products. Among the types of meat which can be packaged in the films and packages according to the present invention are poultry, pork, beef, lamb, goat, horse, and fish. Preferably, the bag of the present invention is used in the packaging of boneless meat products, such as boneless beef, pork, poultry, lamb, and fish products.

In another preferred embodiment, the multilayer film of the invention can be used as a bag or as a tubular casing, preferably a shirrable casing. Preferably, the casing is used for the packaging of food products, especially processed meat products and fresh red meat products. Among the types of meat which can be packaged in the films and packages according to the present invention are poultry, pork, beef, sausage, lamb, goat, horse, and fish. Preferably, the casing of the present invention is used in the packaging of pork, poultry, beef, and sausage products.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

All ranges within all of the above-disclosed ranges are expressly included within this specification. Moreover, layers which are adjacent or directly adhered to one another are preferably of differing chemical composition, especially differing polymeric composition. All reference to ASTM tests are to the most recent, currently approved and published version of the ASTM test identified, as of the priority filing date of this application.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A process for packaging a product, comprising the steps of:
   (A) placing a first product into a flexible, heat-shrinkable bag, the bag having an open top, whereby a first bagged product having excess bag length results, and wherein the bag comprises a heat-shrinkable multilayer film comprising:
      (1) a first layer, which is an inside bag layer, and which comprises polyolefin;
      (2) a second layer comprising at least one member selected from the group consisting of polyolefin, polystyrene, and polyurethane;
      (3) a third layer comprising at least one member selected from the group consisting of amorphous polyester and polyester having a melting point of from about 130° C. to about 260° C.; and
      (4) a fourth layer, which is an outside bag layer, the fourth layer comprising at least one member selected from the group consisting of polyester, polyamide, polypropylene and polyurethane; and
      wherein the bag is produced by sealing the first layer to itself, whereby the first layer is an inside bag layer and the fourth layer is an outside bag layer;
   (B) repeating the placing step with a second product and a second bag, whereby a second bagged product results;
   (C) stacking at least the first and second bagged products so that the excess bag length of each of the bagged products are on top of one another and within a sealing distance of a means for heat-sealing;
   (D) heat-sealing the inside layer of first bag to itself in the region between the open end of the first bag and the product, and the inside layer of the second bag to itself in the region between the open end of the second bag and the product, so that the first product is completely sealed within the first bag and the second product is completely sealed with the second bag, the sealing being carried out at a temperature so that the resulting packaged products can be freely separated from one another without layer delamination.

2. The process according to claim 1, wherein the second layer has a thickness of from about 5 to about 50%, based on the thickness of the heat-shrinkable multilayer film.

3. The process according to claim 1, wherein the heat-shrinkable film further comprises a fifth layer which serves as an $O_2$-barrier layer, the fifth layer comprising at least one member selected from the group consisting of EVOH, PVDC, polyalkylene carbonate, polyamide, and polyethylene naphthalate.

4. The process according to claim 1, wherein the process is carried out in a rotary chamber vacuum machine.

5. The process according to claim 4, wherein 2 bagged products are stacked on top of one another during heat-sealing.

6. The process according to claim 1, wherein from 2 to 5 bagged products are stacked on top of one another during heat-sealing.

7. The process according to claim 1, further comprising evacuating the first and second bags after they are stacked but before they are sealed.

8. The process according to claim 1, wherein the first bag and the second bag are made from films having the same multilayer structure and composition.

9. The process according to claim 1, wherein the film has a total free shrink, at 185° F., of from about 40 to 170 percent.

10. The process according to claim 1, wherein the third layer comprises an amorphous polyester and the fourth layer comprises at least one member selected from the group consisting of amorphous polyester and polyester having a melting point of from about 130° C. to about 260° C.

11. The process according to claim 1, wherein the fourth layer comprises at least one member selected from the group consisting of amorphous polyamide and polyamide having a melting point of from about 130° C. to about 260° C.

12. The process according to claim 1, wherein the fourth layer comprises a polyester having from about 70 to 95 mole percent terephthalate mer units.

13. The process according to claim 1, wherein the film has a gloss of at least 50 percent, as measured against the fourth layer by ASTM D2457.

14. The process according to claim 1, wherein the film has a total thickness of from about 1 to about 5 mils.

15. The process according to claim 14, wherein the film has a total thickness of from about 1.5 to about 3 mils.

16. The process according to claim 1, wherein the film further comprises a fifth layer which serves as an $O_2$-barrier layer and which is between the third layer and the fourth layer, the fifth layer comprising at least one member selected from the group consisting of EVOH, PVDC, polyalkylene carbonate, polyamide, and polyethylene naphthalate.

17. The process according to claim 16, further comprising a sixth layer which comprises at least one member selected from the group consisting of polyester and polyamide, the sixth layer being between the fourth layer and the fifth layer.

18. The process according to claim 16, wherein the first layer comprises ethylene/alpha-olefin copolymer; the second layer comprises ethylene/vinyl acetate copolymer; the third layer comprises polyethylene terephthalate; the fourth layer comprises polyethylene terephthalate; and, the fifth layer comprises EVOH.

19. The process according to claim 16, wherein, based on total film thickness, the first layer has a thickness of from about 1 to 60 percent, the second layer has a thickness of from about 1 to 50 percent, the third layer has a thickness of from about 5 to 40 percent, the fourth layer has a thickness of from about 1 to 40 percent, and, the fifth layer has a thickness of from about 1 to 20 percent.

20. The process according to claim 1, wherein the first layer comprises a blend of homogeneous ethylene/alpha-olefin copolymer and heterogeneous ethylene/alpha-olefin copolymer.

21. The process according to claim 1, wherein the film comprises a crosslinked polymer network.

22. The process according to claim 1, wherein the film has a total free shrink, at 185° F., of from about 60 to 150 percent; an impact strength of at least 60 Newtons, as measured by ASTM D3763; a gloss of at least 50 percent, as measured by ASTM D2457; and a haze of less than 10%, as measured by ASTM D1003.

23. The process according to claim 1, wherein the first layer, consists essentially of at least one member selected from the group consisting of ethylene homopolymer, ethylene copolymer, propylene homopolymer, propylene copolymer, butene homopolymer, butene copolymer, polystyrene, polyamide, polyester, polyurethane, and starch-containing polymer.

24. The process according to claim 23, wherein the first layer consists essentially of at least one member selected from the group comprising ethylene/alpha-olefin copolymer, ethylene/unsaturated ester copolymer, ethylene/unsaturated acid copolymer.

25. The process according to claim 24, wherein the first layer consists essentially of homogeneous ethylene/alpha-olefin copolymer.

26. The process according to claim 1, wherein:

the third layer of the multilayer film comprises at least one member selected from the group consisting of amorphous polyester and polyester having a melting point of from about 130° C. to less than 190° C.; and the fourth layer of the multilayer film comprises at least one member selected from the group consisting of polyester having a melting point of at least 190° C., polyamide, and polyurethane.

27. The process according to claim 26, wherein the multilayer film further comprises a fifth layer which serves as an $O_2$-barrier layer and which is between the third layer and the fourth layer, the fifth layer comprising EVOH.

28. The process according to claim 27, wherein the multilayer film further comprises a sixth layer which comprises at least one member selected from the group consisting of amorphous polyester and polyester having a melting point of from about 130° C. to less than 190° C., the sixth layer being between the fourth layer and the fifth layer.

29. The process according to claim 27, wherein the fourth layer comprises the polyester having a melting point of at least 190° C.

30. The process according to claim 28, wherein the fourth layer comprises the polyester having a melting point of at least 190° C.

* * * * *